(12) United States Patent
Watson

(10) Patent No.: US 6,549,381 B1
(45) Date of Patent: Apr. 15, 2003

(54) DISK DRIVE HAVING ACTUATOR MOTION DAMPER VIA HISTERESIS ENERGY LOSS OF LOW ENERGY MAGNET PLACED WITHIN MAGNETIC FIELD OF A VOICE COIL MOTOR

(75) Inventor: Scott E. Watson, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 37 days.

(21) Appl. No.: 10/003,801

(22) Filed: Oct. 23, 2001

(51) Int. Cl.[7] .................................................. G11B 5/55

(52) U.S. Cl. .................................................... 360/264.9

(58) Field of Search ........................... 360/264.9, 264.7, 360/264.8

(56) References Cited

U.S. PATENT DOCUMENTS

| | | | | |
|---|---|---|---|---|
| 5,193,037 A | * | 3/1993 | Pace ......................... | 360/264.8 |
| 5,523,911 A | * | 6/1996 | Mita et al. ................ | 360/264.7 |
| 6,392,845 B1 | * | 5/2002 | Tsuda et al. ............. | 360/264.9 |

\* cited by examiner

Primary Examiner—Robert S. Tupper
(74) Attorney, Agent, or Firm—W. Chris Kim Esq.; Milad G. Shara, Esq.; Young Law Firm

(57) ABSTRACT

A disk drive includes a disk having a recording surface and a head stack assembly that includes an actuator body; an actuator arm cantilevered from the actuator body and including a head for reading and writing on the recording surface; a coil cantilevered from the actuator body in an opposite direction from the actuator arm, the coil defining a first leg and a second leg and a damping magnet disposed between the first and second legs. The damping magnet is configured to exert a damping force on the head stack assembly that is greater when the head is at a predetermined non-operational position than when the head is over the recording surface.

12 Claims, 6 Drawing Sheets

DISK DRIVE HAVING ACTUATOR MOTION DAMPER VIA HISTERESIS ENERGY LOSS OF LOW ENERGY MAGNET PLACED WITHIN MAGNETIC FIELD OF A VOICE COIL MOTOR

BACKGROUND OF THE INVENTION

1. Field of the Invention

The present invention relates to disk drives. More particularly, the present invention relates to disk drives in which the motion of the actuator assembly is damped using a damping magnet placed within the magnetic field of the voice coil motor.

2. Description of the Prior Art

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a head with at least one transducer for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the head toward the disk; and (3) a flex cable assembly: that provides an electrical interconnect with minimal constraint on movement.

A typical HGA includes a load beam, a gimbal attached to an end of the load beam, and a head attached to the gimbal. The load beam has a spring function that provides a "gram load" biasing force and a hinge function that permits the head to follow the surface contour of the spinning disk. The load beam has an actuator end that connects to the actuator arm and a gimbal end that connects to the gimbal that carries the head and transmits the gram load biasing force to the head to "load" the head against the disk. A rapidly spinning disk develops a laminar airflow above its surface that lifts the head away from the disk in opposition to the gram load biasing force. The head is said to be "flying" over the disk when in this state.

Within the HDA, the spindle motor rotates the disk or disks, which are the media to and from which the data signals are transmitted via the head on the gimbal attached to the load beam. The transfer rate of the data signals is a function of rotational speed of the spindle motor; the faster the rotational speed, the higher the transfer rate. A spindle motor is essentially an electro-magnetic device in which the electromagnetic poles of a stator are switched on and off in a given sequence to drive a hub or a shaft in rotation.

FIG. 1 shows the principal components of a magnetic disk drive 100 constructed in accordance with the prior art. With reference to FIG. 1, the disk drive 100 is an Integrated Drive Electronics (IDE) drive comprising a RDA 144 and a PCBA 114. The HDA 144 includes a base 116 and a cover 117 attached to the base 116 that collectively house a disk stack 123 that includes a plurality of magnetic disks (of which only a first disk 111 and a second disk 112 are shown in FIG. 1), a spindle motor 113 attached to the base 116 for rotating the disk stack 123, an HSA 120, and a pivot bearing cartridge 184 (such as a stainless steel pivot bearing cartridge, for example) that rotatably supports the HSA 120 on the base 116. The spindle motor 113 rotates the disk stack 123 at a constant angular velocity. The HSA 120 comprises a swing-type or rotary actuator assembly 130, at least one HGA 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160. The actuator arm 160 supports the HGA 110 with a head. The flex cable assembly 180 includes a flex circuit cable and a flex clamp 159. The HSA 120 is pivotally secured to the base 116 via the pivot-bearing cartridge 184 so that the head at the distal end of the HGA 110 may be moved over a recording surface of the disks 111, 112. The pivot-bearing cartridge 184 enables the HSA 120 to pivot about a pivot axis, shown in FIG. 1 at reference numeral 182. The storage capacity of the HDA 111 may be increased by including additional disks in the disk stack 123 and by an HSA 120 having a vertical stack of HGAs 110 supported by multiple actuator arms 160.

The "rotary" or "swing-type" actuator assembly comprises a body portion 140 that rotates on the pivot bearing 184 cartridge between limited positions, a coil portion 150 that extends from one side of the body portion 140 to interact with one or more permanent magnets 192 mounted to back irons 170, 172 to form a voice coil motor (VCM), and an actuator arm 160 that extends from an opposite side of the body portion 140 to support the HGA 110. The VCM causes the HSA 120 to pivot about the actuator pivot axis 182 to cause the read write heads of the HSA 120 to sweep radially over the disk(s) 111, 112.

Dynamic load/unload (LUL) of flying heads in rigid disk drives offers many technical advantages along with new engineering challenges. Among these challenges are 1) methods of retaining the actuator in the non-operational position on the ramp and 2) ensuring that upon loss of power, the flying heads are not unloaded at too high of a velocity.

Many solutions for retaining the actuator in the non-operational position on a contact-start-stop (CSS) drive are well known such as magnetic, air-vane, spring detent, and the like. Furthermore, the contact friction of the heads resting on the CSS area (an annular region on each of the disks 111, 112 that is typically located at the inner diameter -ID) of the disks of a CSS drive helps retain the actuator assembly 120 in the non-operational position. These solutions work quite well to retain the actuator assembly 120 in the non-operational position during mechanical shocks. Controlled, low-velocity unloads are required to ensure that neither the heads nor media are damaged. The critical unload operation occurs when power is suddenly removed from the drive. The actuator may be moving at a high velocity towards the ramp; neither normal servo control nor full power is available to brake the actuator assembly 120 before loading onto the ramp. In this case, some means of slowing the actuator prior to reaching the ramp would aid in unload velocity control.

For dynamic LUL drives, a controlled, low-velocity loading of the heads onto the rotating disks is necessary to eliminate the potential of head/media contact and damage during the load. In a LUL drive, portions of the head suspension contact a ramp during non-operation, and the friction between the ramp and suspension are designed to low values to allow low-velocity motion control. This low friction offers little retaining force to the actuator and may allow the actuator to move under the influence of even small mechanical shocks. A detent on the ramp is usually employed to increase the retaining force, but the angle of detent is similarly limited to low values and hence offers little improvement.

What are needed, therefore, are improved head stack assemblies and drives that include a structure to slow the actuator prior to reaching the ramp or the CSS area of the disk or disks.

SUMMARY OF THE INVENTION

Accordingly, this invention may be regarded as a disk drive including a disk having a recording surface, a ramp structure defining a ramp surface and a head stack assembly. The head stack assembly includes an actuator body, an actuator arm cantilevered from the actuator body and including a head for reading and writing on the recording surface, the head resting on the ramp surface when the disk drive is non-operational, a coil cantilevered from the actuator body in an opposite direction from the actuator arm, the coil defining a first leg and a second leg and a damping magnet disposed between the first leg and the second leg. The damping magnet may be configured to exert a damping force on the head stack assembly, the damping force being greater when the head is on the ramp surface than when the head is over the recording surface.

The disk drive may further include a first and a second VCM magnet. The first VCM magnet may define a first south magnetic pole and a first north magnetic pole separated by a first transition zone. The second VCM magnet may face and be spaced apart from the first VCM magnet, the second VCM magnet defining a second south magnetic pole and a second north magnetic pole separated by a second transition zone, the second transition zone being aligned with the first transition zone. The region of highest magnetic flux density of the damping magnet may be substantially aligned with the first and second transition zones when the head rests on the ramp surface. The coil may be partially encased in a plastic overmold and the plastic overmold may be configured to secure the damping magnet between the first and second legs.

The present invention is also a head stack assembly for a disk drive including a disk having a recording surface. The head stack assembly includes an actuator body, an actuator arm cantilevered from the actuator body and including a head configured for reading and writing on the recording surface of the disk, a coil cantilevered from the actuator body in an opposite direction from the actuator arm, the coil defining a first leg and a second leg, and a damping magnet disposed between the first leg and the second leg for exerting a damping force on the head stack assembly. The damping force may be greatest when the head is positioned at a predetermined non-operational position in the disk drive.

The coil may be partially encased in a plastic overmold and the plastic overmold may be configured to secure the damping magnet between the first and second legs. The predetermined non-operational position may be located on a contact start stop (CSS) area of the disk. The selected non-operational position may be located on a ramp surface of a ramp load structure of the disk drive on which the head rests when the disk drive is non-operational.

The present invention may also be viewed as a disk drive that includes a disk having a recording surface and a head stack assembly. The head stack assembly includes an actuator body, an actuator arm cantilevered from the actuator body and including a head for reading and writing on the recording surface, a coil cantilevered from the actuator body in an opposite direction from the actuator arm, the coil defining a first leg and a second leg, and a damping magnet disposed between the first leg and the second leg. The damping magnet may be configured to exert a damping force on the head stack assembly, the damping force being greater when the head is at a predetermined non-operational position than when the head is over the recording surface.

The disk drive may further include a first VCM magnet and a second VCM magnet. The first VCM magnet may define a first south magnetic pole and a first north magnetic pole separated by a first transition zone. The second VCM magnet may face and be spaced apart from the first VCM magnet, the second VCM magnet defining a second south magnetic pole and a second north magnetic pole separated by a second transition zone, the second transition zone being aligned with the first transition zone, a region of highest magnetic flux density of the damping magnet being substantially aligned with the first and second transition zones when the head is at the predetermined non-operational position. The coil may be partially encased in a plastic overmold and the plastic overmold may be configured to secure the damping magnet between the first and second legs. The disk may further include a contact start stop (CSS) surface and the predetermined position may be located on the CSS surface. The disk drive further may include a ramp structure defining a ramp surface and the predetermined position may be located on the ramp surface.

The foregoing and other features of the invention are described in detail below and set forth in the appended claims.

DESCRIPTION OF THE PREFERRED EMBODIMENTS

Figure 2:
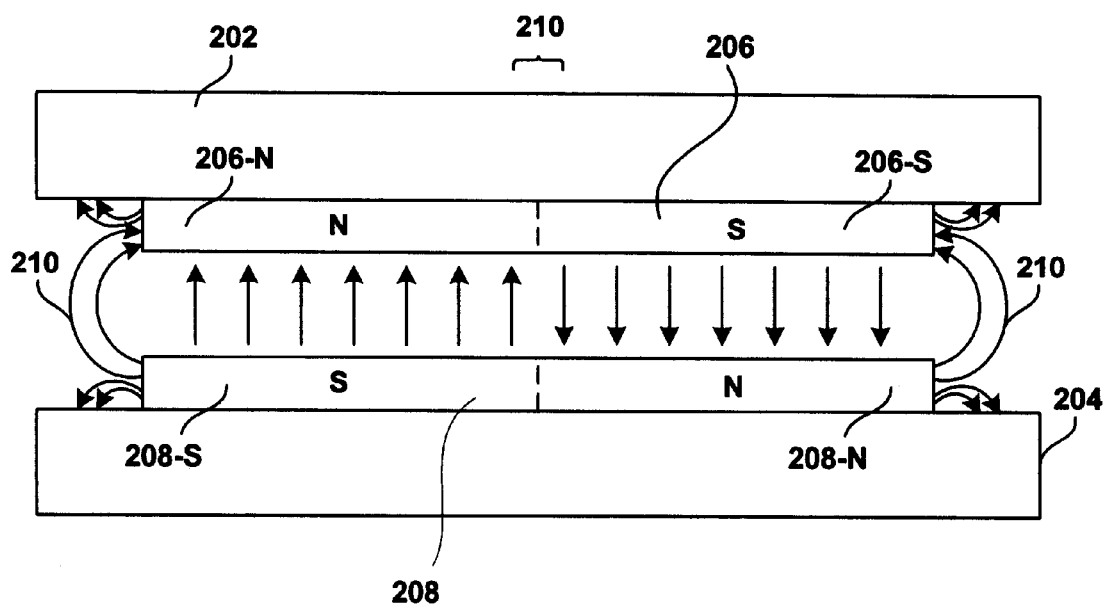
FIG. 2 is a representation of magnetic flux fields created by the permanent magnets of a VCM.
Figure 3:
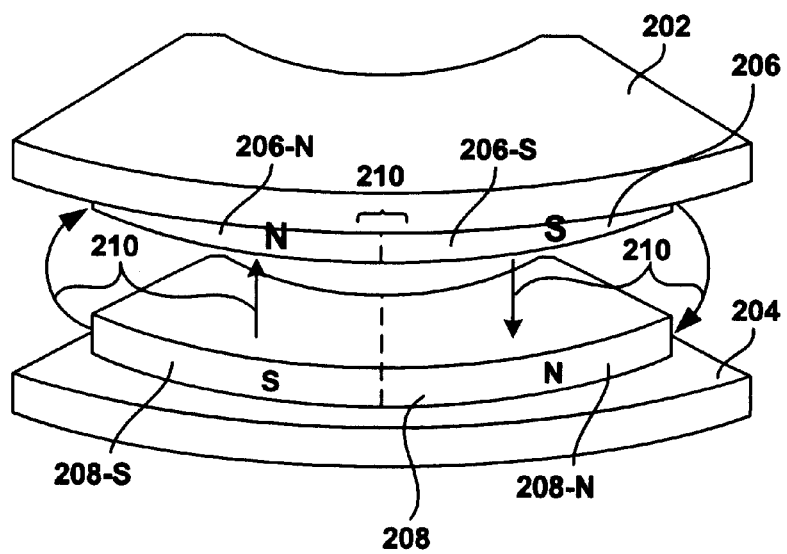
FIG. 3 is a perspective representation of FIG. 2.

FIG. 2 is a representation of magnetic flux fields in a conventional permanent magnet arrangement forming a component of a VCM. FIG. 3 is a perspective representation of FIG. 2. To enable the magnetic flux field 210 to be clearly represented, the coil portion 150 of the VCM is omitted from both FIGS. 2 and 3. Considering now these figures, collectively, conventional disk drive VCMs include a top back iron 202 and a lower back iron 204. A top VCM magnet 206 that includes a top magnet north pole 206-N and top magnet south pole 206-S is attached to the top back iron 202. Similarly, a bottom VCM magnet 208 that includes a bottom magnet south pole 208-S and a bottom magnet north pole 208-N is attached to the bottom back iron 204. Conventional VCMs are designed to provide a uniform magnetic field 210 across the stroke of the actuator assembly (not shown in FIG. 2) to each of the two active legs of the coil portion 150. While one coil leg is subjected to a magnetic field having a north-south polarity, the other leg is subjected to a magnetic field having a south-north polarity. The VCM has a transition zone 210 between the two magnetic field directions, which the coil 150 does not cross during normal operation.

Figure 1:
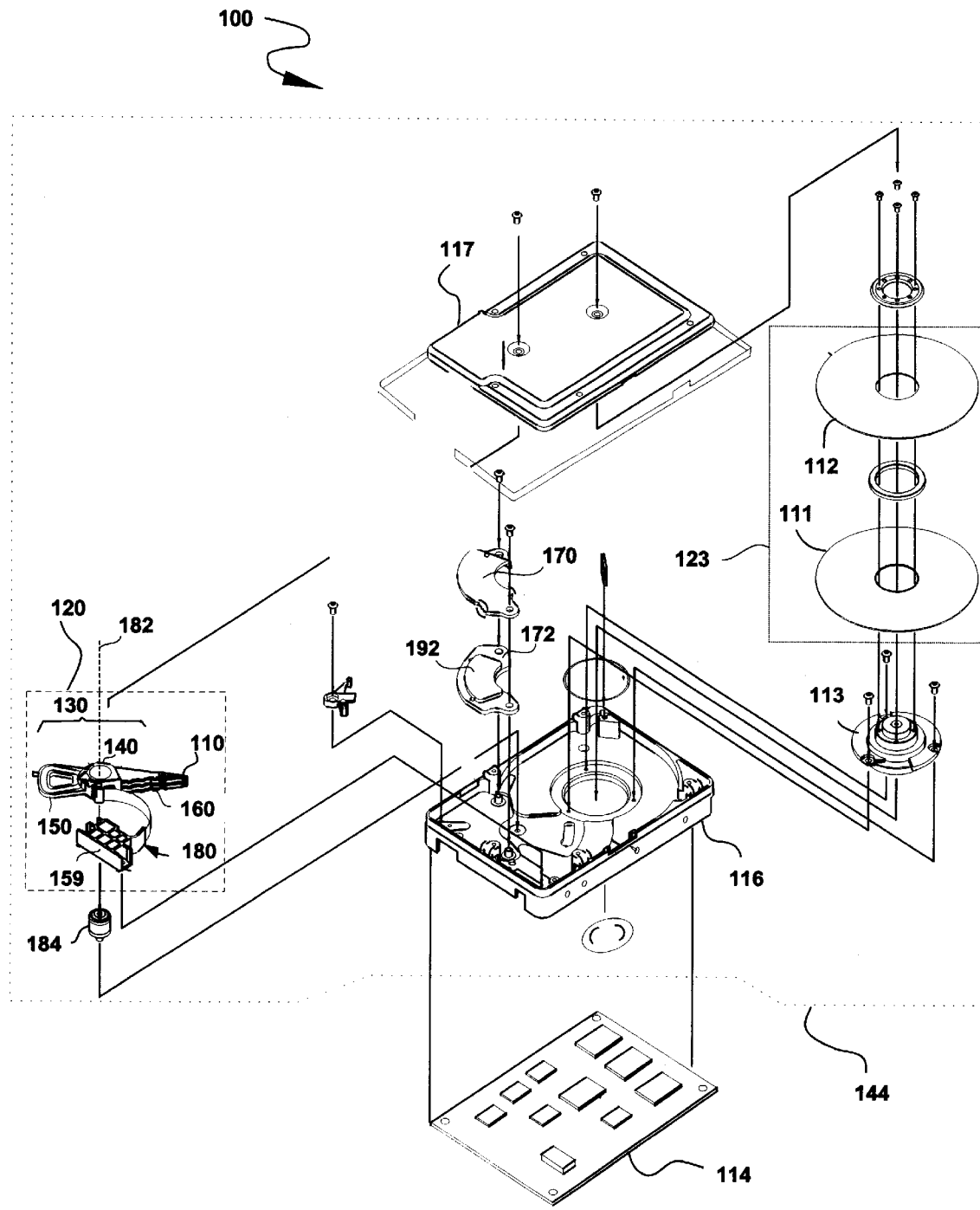
FIG. 1 is an exploded view of a conventional disk drive.
Figure 4:
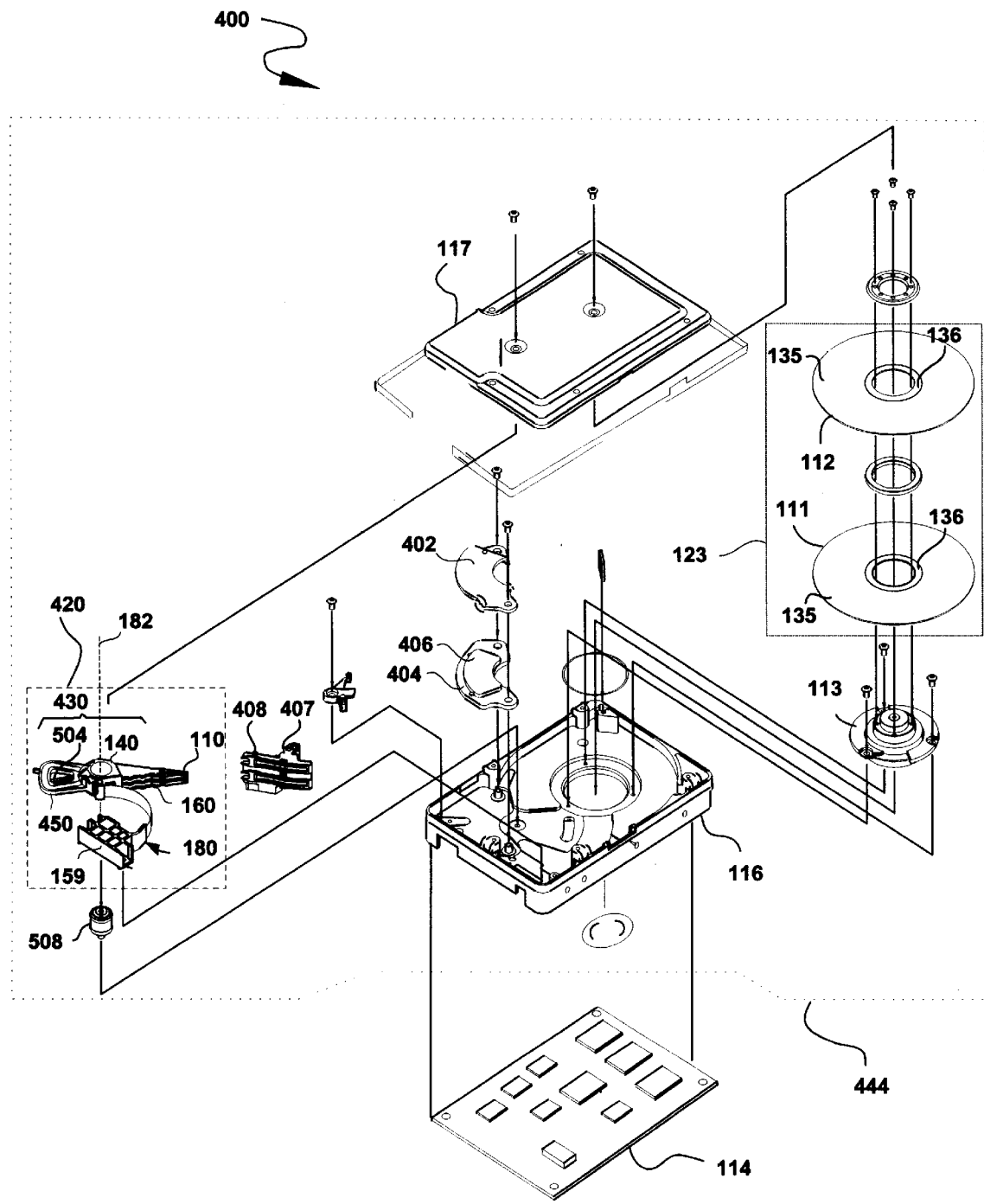
FIG. 4 is an exploded view of a disk drive according to an,:embodiment of the present invention.

FIG. 4 is an exploded view of a disk drive 200 according to an embodiment of the present invention. Elements of the disk drive 200 that are the same or similar to the corresponding structures shown in FIG. 1 are denoted by identical reference numerals, unless otherwise noted. As shown therein, the disk drive 200 includes a disk (two disks 111:, 112 are shown in FIG. 4) having a recording surface 135. The disk(s) 111, 112 may also include a CSS area 136, if the drive 400 is a CSS-type disk drive.

If the disk 400 is of the LUL type, the disk drive 400 may include a ramp structure 407 for loading and unloading the heads. The ramp structure 407 define a ramp surface 408 against which the lift-surface portion (for example) of the HGA 110 slides during unloading and loading operations. According to the present invention, the ramp structure 407 may be any ramp structure that defines a ramp surface 408. Advantageously, the present disk drive may include the ramp structure described in copending and commonly assigned U.S. patent application Ser. No. 09/406,254 filed on Sep. 27, 1999, the disclosure of which is hereby incorporated herein in its entirety. However, the present invention is suitable to any ramp structure in a LUL drive, the present invention not being limited by the structure of the ramp shown in FIG. 4. If, however, the disk drive 200 is of the CSS type, no such ramp structure 407 is present, the head(s) 421 being positioned at a predetermined position 136 on the recording surfaces 135 of the disk(s) 111, 112 of disk stack 123 when the drive is non-operational, as developed further below.

Figure 10:
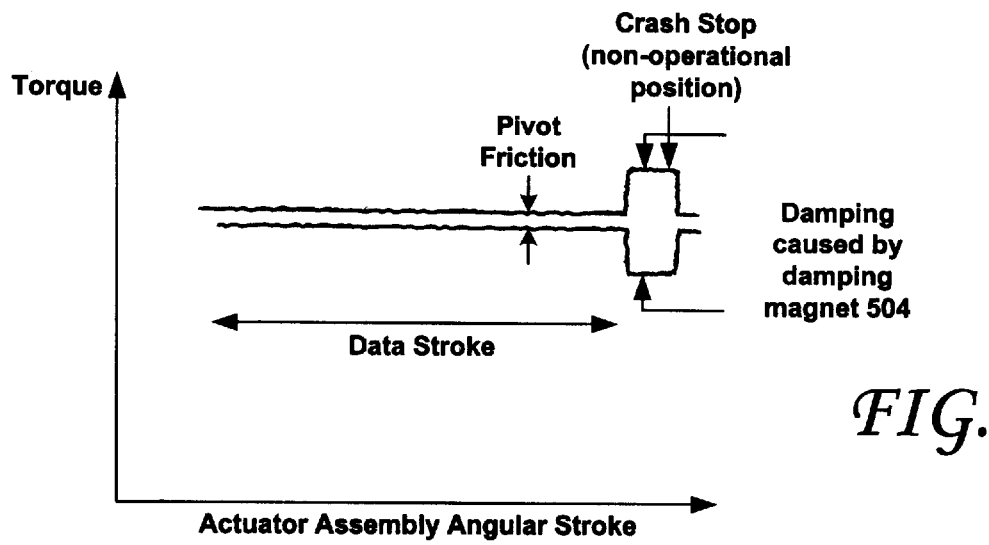
FIG. 10 is a graph or torque versus actuator angular stroke of the actuator assembly of a CSS disk drive according to another embodiment of the present invention.
Figure 11:
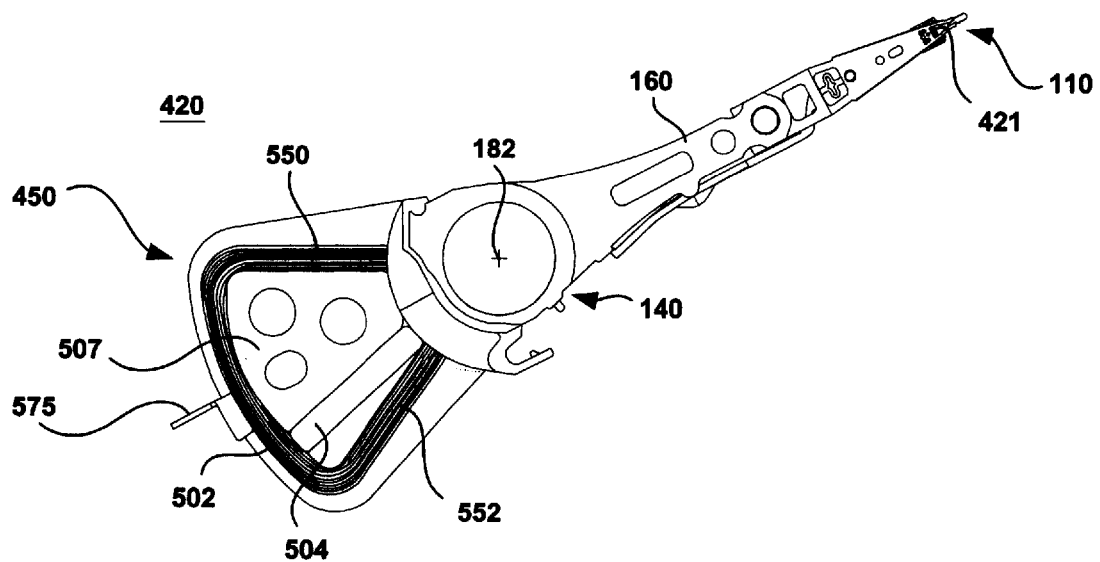
FIG. 11 shows a head stack assembly, according to an embodiment of the present invention. For clarity, the head stack assembly is shown in FIG. 11 without the flex circuit cable assembly.

As shown in FIGS. 4 and 10, the HSA 420 of the HDA 444 of the disk drive 400 according to the present invention includes a swing-type or rotary actuator assembly 430, an actuator arm 160 cantilevered from the actuator body 140 and including a head 421 for reading and writing on the recording surface 135. When the disk drive is operational (ex.g., accessing, reading or writing), the head(s) 421 are positioned over the recording surface 135 and when the disk drive is non-operational, the head(s) 421 rest on the ramp surface 408 (in the case of an LUL drive) or on the CSS area 136 (in the case of a CSS-type drive). A coil 502 is cantilevered from the actuator body 140 in an opposite direction from the actuator arm 160, the coil 502 defining a first leg 550 and a second leg 552. The HSA 420 according too the present invention also includes a damping magnet 504 disposed between the first leg 550 and the second leg 552 of the coil 502, the damping magnet 504 being configured to exert a damping force on the HSA 420. As shown in FIG. 11, the coil 502 may be at least partially encased in a plastic overmold 507. This plastic overmold 507 may be configured to secure the damping magnet 504 between the first leg 550 and the second leg 552.

Figure 5:
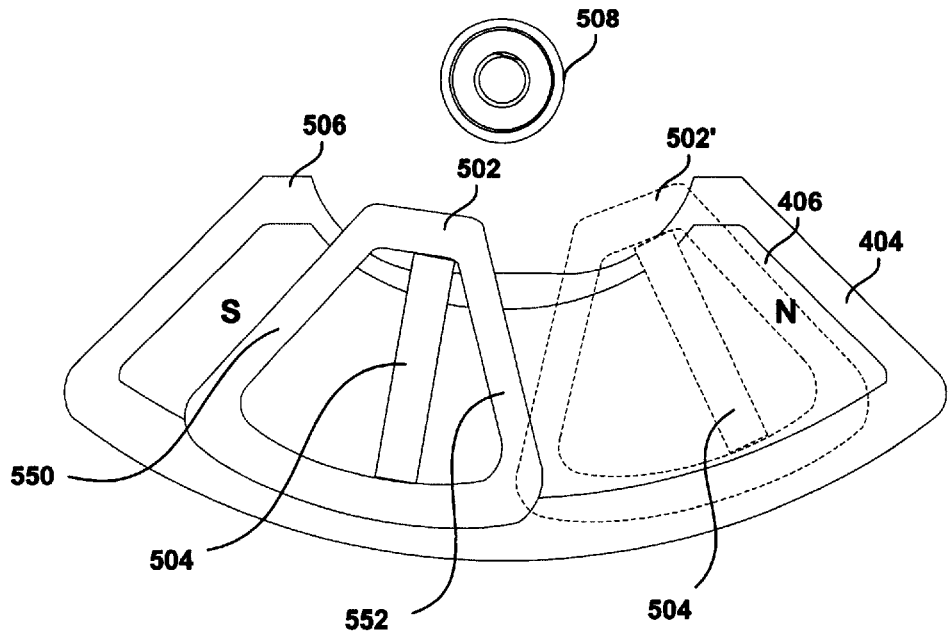
FIG. 5 shows an exemplary placement of a damping magnet within the magnetic flux fields of a voice coil motor, according to an embodiment of the present invention.
Figure 6:
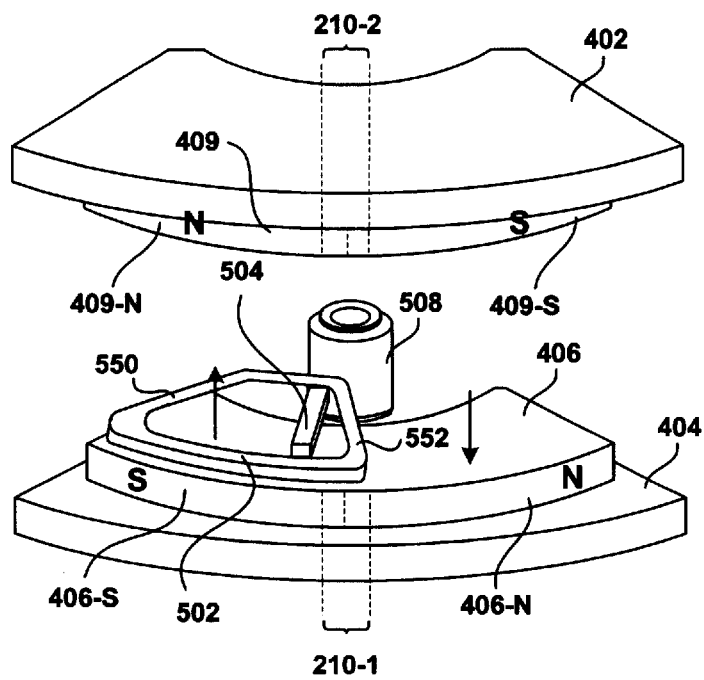
FIG. 6 is a perspective representation of a portion of a flat voice coil motor, according to an embodiment of the present invention.

FIG. 5 shows an exemplary placement of a damping magnet within the magnetic flux fields of a voice coil motor, according to an embodiment of the present invention. FIG. 6 is a perspective representation of a portion of a flat voice coil motor, according to an embodiment of the present invention. The body portion 140 and the actuator 160 are omitted in FIGS. 5 and 6 for clarity of illustration. Considering now FIGS. 5 and 6 collectively, the disk drive 400 may also include a first VCM magnet 406 defining a first south magnetic pole 406-S and a first north a magnetic pole 406-N separated by a first (polarity) transition zone 201-1. A second VCM magnet 409 faces and is spaced apart from the first VCM magnet 406. The second VCM magnet 409 defines a second south magnetic pole 409-S and a second north magnetic pole 409-N separated by a second transition zone 201-2. The second transition zone 201-2 is preferably aligned with the first transition zone 201-1. According to the present invention, the region of highest magnetic flux density of the damping magnet 504 is aligned or substantially aligned with the first and second transition zones 201-1 and 201-2 when the head 421 rests on the ramp surface 408. As shown in FIGS. 5 and 6, the damping magnet 504 may be disposed between the first and second legs 550, 552 of the coil 502. In operation, the strong uniform field of the VCM (created by the first and second magnets 406, 409) initially magnetizes the damping magnet 504 in a first polarity. While moving through the stroke (range of travel) of the actuator assembly 430, the damping magnet 504 passes through the aligned transition zones 201-1 and 202-2 and becomes magnetized into a second opposite polarity. Thereafter, as the damping magnet moves back through the aligned transition zones 201-1 and 201-2, the dam ping magnet becomes re-magnetized by the new field polarity and absorbs energy in the process of doing so. The reverse motion of the actuator assembly 430 (traveling through its stroke in the opposite direction, as shown in dashed lines in FIG. 5) again re-magnetizes the damping magnet 504 and causes it again to dissipate further energy. According to the present invention, the damping force exerted by the damping magnet 504 on the HSA 420 is preferably greater when the head(s) 421 is (are) on the ramp surface 408 (or over, on the CSS area 136) than when the head(s) is (are) over the recording surface 135 of the disk(s) 111, 112.

Figure 7:
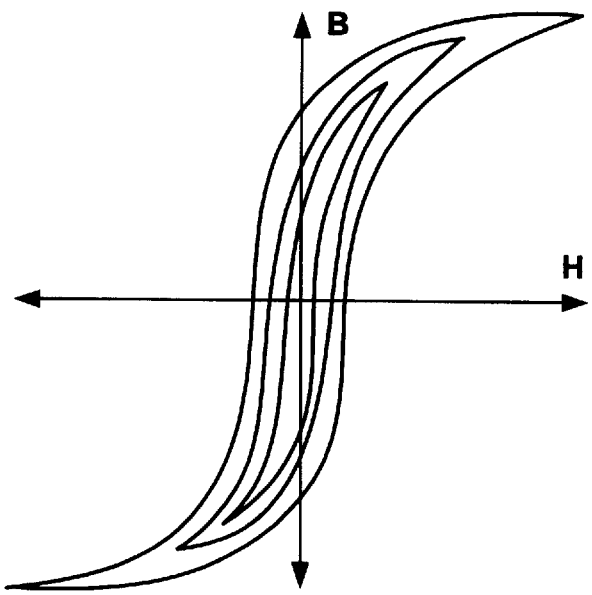
FIG. 7 shows the hysteresis plot of a typical magnetic material.

FIG. 7 shows the hysteresis plot of a typical magnetic material, showing a family of B-H curves for several values of H. As shown, the abscissa shows the magnetic flux intensity H whereas the ordinate shows the magnetic flux density B of the magnetic material. As shown, applying an increasing H field to an initially nonmagnetized ferromagnetic material (such as the that of the present damping magnet 507, for example), causes the magnetization of the material to increase until saturation is reached (upper right of curve), at which point all magnetic domains within the magnetic material may be considered to aligned in a first direction. If the magnetizing force H is now decreased (by passing the damping magnet 504 through the aligned transition zones 201-1 and 201-2 and into the area of opposite magnetic polarity of the VCM, for example), magnetic flux intensity B will not decrease along the same curve, but will decrease along another curve until saturation is reached (lower left of hysteresis plot) at which point all magnetic domains may be considered to be aligned in a second direction that is opposite the first direction. Therefore, as the magnetic material of the damping magnet 504 is exposed to the external magnetic field of the first and second magnets 406, 409, work is done to realign the magnetic domains of the damping magnet 504 with that of the external first and second magnets 406, 409. As the actuator assembly 430 travels through its full stroke, work is done again to realign the magnetic domains of the damping magnet 504 with that of the first and second magnets 406, 409. This work is non-reversible and manifests itself as thermal energy. The area of the hysteresis loop of FIG. 7 is a measure of energy lost to heat over the stroke of the actuator assembly.

Figure 8:
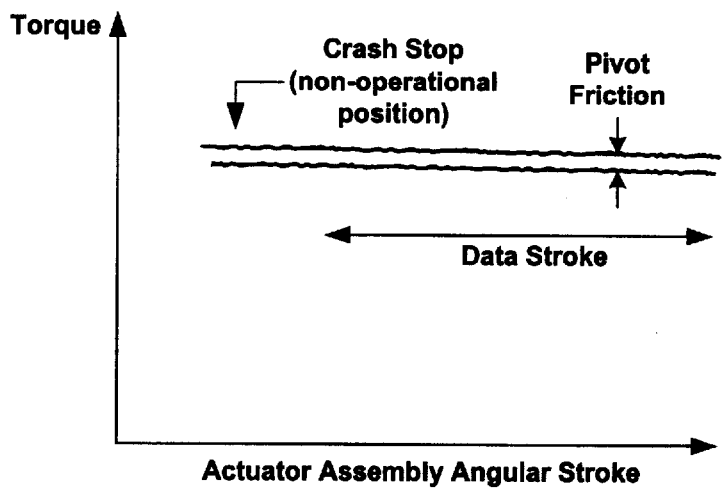
FIG. 8 is a graph or torque versus actuator angular stroke of a conventional actuator assembly.

FIG. 8 is a graph of torque versus actuator angular stroke of a conventional actuator assembly. Conventionally, the torque on the actuator assembly (such as actuator assembly 130 shown in FIG. 1) remains substantially constant through the data stroke of the actuator assembly 130, the data stroke being the distance over which the head(s) of the actuator assembly are over a data portion of the disk(s) 111, 112. Some torque is lost due to friction as the pivot-bearing cartridge 184 rotates about its axis 182. The location where the crash stop (an example of which is shown in FIG. 11 at 575) hits an outer diameter (OD) travel limit stop (not shown) integrated into the drive 100 is shown in FIG. 8.

Figure 9:
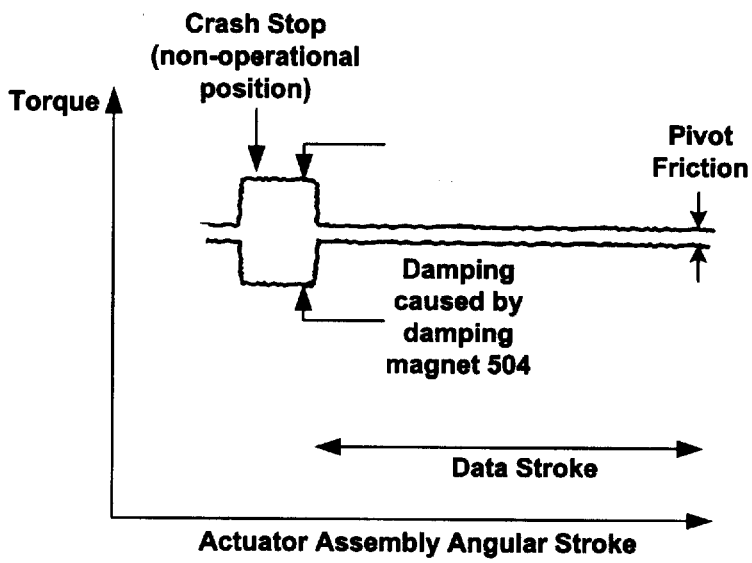
FIG. 9 is a graph or torque versus actuator angular stroke of the actuator assembly of a LUL disk drive according to an embodiment of the present invention.

FIG. 9 is a graph of torque versus actuator angular stroke of the actuator assembly 430 of a LUL disk drive 400, according to an embodiment of the present invention. As shown therein, the torque on the actuator assembly 130 is substantially constant until the head(s) 421 is (are) on the ramp surface 408 of the ramp structure 407, near the OD of the disk(s) 111, 112. When the head(s) 421 is (are) on the ramp surface 408, a damping force (increased torque, either in the positive or the negative direction) is exerted on the head stack assembly 430 by the damping magnet 504. The size, shape and placement of the damping magnet 504 between the first and second legs 550, 552 of the coil 502 (as well as the geometry of the VCM itself) are each selected such that the damping effect (the force exerted on the head stack assembly 430 by the damping magnet 504) works to retain the actuator assembly 430 in the non-operational position on the ramp surface 408 and/or to slow the actuator assembly 430 as it approaches the ramp structure 407. The damping force exerted by the damping magnet 504 on the actuator assembly 430 is greater when the head(s) 421 is (are) on the ramp surface 408 than when the head(s) 421 is (are) over the recording surface 135 of the disk(s) 111, 112. Indeed, each of the size, shape and placement of the damping magnet 504 between the first and second legs 550, 552 of the coil 502 (as well as the geometry of the VCM itself) is preferably selected so as to eliminate or substantially eliminate any friction or bias effects in the data stroke portion of the stroke of the actuator assembly 430 and to narrow the profile of the damping caused by the damping magnet 504.

FIG. 10 is a graph of torque versus actuator angular stroke of the actuator assembly of a CSS-type disk drive according to another embodiment of the present invention. Such a drive is similar to the drive 400 shown in FIG. 4, but for the absence of the ramp structure 407. Indeed, in a CSS drive, when the drive is non-operational, the head(s) 421 rest on the CSS area 136 (usually located at the ID of the disk(s) 111, 112) and no ramp structure 407 is needed. In this case, the increased torque on the head stack assembly 430 is seen toward the portion of the data stroke that is nearest the ID of the disk(s) 111, 112. That is, the damping force exerted by the damping magnet 504 on the head stack assembly 430 is greatest when the head(s) 421 is (are) positioned at a predetermined non-operational position in the disk drive, such as the CSS area 136 of the disk(s) 111, 112. The portion of the stroke of the head stack assembly 430 in which the damping force is exerted is located at the ID of the disk(s) 111, 112—at the CSS area 136 of the disk(s) 111, 112. As shown in FIGS. 9 and 10, additional torque must be exerted on the head stack assembly 430 to cause the head(s) 421 to leave either the ramp structure 407 or the CSS area 136 of the disk(s) 111, 112 during unloading operations. The size, shape, manufacturability, process, cost and location within the coil portion 150 of the head stack assembly 430 are selected so as to achieve the desired profile for the damping force exerted by the damping magnet 504 on the head stack assembly 430. Generally it is to be expected that the smallest damping magnet 504 having the desired damping profile will be selected. However, that need not be the case. As alluded to above, the damping magnet 504 may have any shape, the shape thereof not being limited to the rectangular shape shown in the figures.

Significantly, the use of the damping magnet provides improved head stack assemblies and drives in which the actuator assembly is slowed prior to reaching the ramp or the CSS area 136 of the disk or disks 111, 112.

What is claimed is:

1. A disk drive, comprising:
 a disk having a recording surface;
 a ramp structure defining a ramp surface;
 a head stack assembly including:
  an actuator body;
  an actuator arm cantilevered from the actuator body and including a head for reading and writing on the recording surface, the head resting on the ramp surface when the disk drive is non-operational,
  a coil cantilevered from the actuator body in an opposite direction from the actuator arm, the coil defining a first leg and a second leg; and
  a damping magnet disposed between the first leg and the second leg, the damping magnet being configured to exert a damping force on the head stack assembly, the damping force being greater when the head is on the ramp surface than when the head is over the recording surface.

2. The disk drive of claim 1, further comprising:
 a first VCM magnet defining a first south magnetic pole and a first north magnetic pole separated by a first transition zone;
 a second VCM magnet facing and spaced apart from the first VCM magnet, the second VCM magnet defining a second south magnetic pole and a second north magnetic pole separated by a second transition zone, the second transition zone being aligned with the first transition zone, a region of highest magnetic flux density of the damping magnet being substantially aligned with the first and second transition zones when the head rests on the ramp surface.

3. The disk drive of claim 1, wherein the coil is partially encased in a plastic overmold and wherein the plastic overmold is configured to secure the damping magnet between the first and second legs.

4. A head stack assembly for a disk drive including a disk having a recording surface, comprising:
 an actuator body;
 an actuator arm cantilevered from the actuator body and including a head configured for reading and writing on the recording surface of the disk;
 a coil cantilevered from the actuator body in an opposite direction from the actuator arm, the coil defining a first leg and a second leg; and
 a damping magnet disposed between the first leg and the second leg for exerting a damping force on the head stack assembly, the damping force being greatest when the head is positioned at a predetermined non-operational position in the disk drive.

5. The head stack assembly of claim 4, wherein the coil is partially encased in a plastic overmold and wherein the plastic overmold is configured to secure the damping magnet between the first and second legs.

6. The head stack assembly of claim 4, wherein the predetermined non-operational position is located on a contact start stop (CSS) area of the disk.

7. The head stack assembly of claim 4, wherein the selected non-operational position is located on a ramp surface of a ramp load structure of the disk drive on which the head rests when the disk drive is non-operational.

8. A disk drive, comprising:
   a disk having a recording surface;
   a head stack assembly including:
      an actuator body;
      an actuator arm cantilevered from the actuator body and including a head for reading and writing on the recording surface;
      a coil cantilevered from the actuator body in an opposite direction from the actuator arm, the coil defining a first leg and a second leg; and
      a damping magnet disposed between the first leg and the second leg, the damping magnet being configured to exert a damping force on the head stack assembly, the damping force being greater when the head is at a predetermined non-operational position than when the head is over the recording surface.

9. The disk drive of claim 8, further comprising:
   a first VCM magnet defining a first south magnetic pole and a first north magnetic pole separated by a first transition zone;
   a second VCM magnet facing and spaced apart from the first VCM magnet, the second VCM magnet defining a second south magnetic pole and a second north magnetic pole separated by a second transition zone, the second transition zone being aligned with the first transition zone, a region of highest magnetic flux density of the damping magnet being substantially aligned with the first and second transition zones when the head is at the predetermined non-operational position.

10. The disk drive of claim 8, wherein the coil is partially encased in a plastic overmold and wherein the plastic overmold is configured to secure theldamping magnet between the first and second legs.

11. The disk drive of claim 8, wherein the disk further includes a contact start stop (CSS) surface and wherein the predetermined position is located on the CSS surface.

12. The disk drive of claim 8, wherein the disk drive further includes a ramp structure defining a ramp surface and wherein the predetermined position is located on the ramp surface.

* * * * *